US008214375B2

(12) United States Patent
Fitzmaurice et al.

(10) Patent No.: US 8,214,375 B2
(45) Date of Patent: Jul. 3, 2012

(54) MANUAL AND AUTOMATIC TECHNIQUES FOR FINDING SIMILAR USERS

(75) Inventors: George Fitzmaurice, Toronto (CA); Tovi Grossman, Toronto (CA); Justin Frank Matejka, Etobicoke (CA); Wei Li, Waterloo (CA)

(73) Assignee: Autodesk, Inc., San Rafael, CA (US)

( * ) Notice: Subject to any disclaimer, the term of this patent is extended or adjusted under 35 U.S.C. 154(b) by 573 days.

(21) Appl. No.: 12/399,247

(22) Filed: Mar. 6, 2009

(65) Prior Publication Data

US 2010/0131896 A1    May 27, 2010

Related U.S. Application Data

(60) Provisional application No. 61/118,153, filed on Nov. 26, 2008.

(51) Int. Cl.
*G06F 17/30* (2006.01)
(52) U.S. Cl. ......... 707/749; 707/750; 707/751; 707/784
(58) Field of Classification Search .................. 707/706, 707/727, 732, 733, 734, 737, 738, 749, 784, 707/750, 751
See application file for complete search history.

(56) References Cited

U.S. PATENT DOCUMENTS

| | | | |
|---|---|---|---|
| 6,745,178 B1 * | 6/2004 | Emens et al. ................. 707/741 |
| 7,188,153 B2 * | 3/2007 | Lunt et al. ..................... 709/218 |
| 7,765,265 B1 * | 7/2010 | Granito et al. ............... 709/206 |
| 7,895,208 B2 * | 2/2011 | Konopnicki ................. 707/738 |
| 7,933,856 B2 * | 4/2011 | Verspoor et al. ............. 706/55 |
| 2002/0116291 A1 * | 8/2002 | Grasso et al. .................. 705/27 |
| 2005/0010823 A1 * | 1/2005 | Kelley et al. ................. 713/202 |
| 2006/0020662 A1 * | 1/2006 | Robinson ..................... 709/203 |
| 2006/0195790 A1 * | 8/2006 | Beaupre et al. .............. 715/727 |
| 2006/0282426 A1 * | 12/2006 | Spears .............................. 707/5 |
| 2007/0067853 A1 * | 3/2007 | Ramsey ........................ 726/28 |
| 2007/0203872 A1 * | 8/2007 | Flinn et al. .................... 706/62 |
| 2008/0228811 A1 * | 9/2008 | Drews et al. ................. 707/102 |
| 2008/0235216 A1 * | 9/2008 | Ruttenberg ...................... 707/5 |
| 2009/0037355 A1 * | 2/2009 | Brave et al. .................... 706/45 |
| 2009/0271417 A1 * | 10/2009 | Toebes et al. ................. 707/100 |
| 2009/0307262 A1 * | 12/2009 | Jeong et al. .............. 707/103 R |
| 2009/0313285 A1 * | 12/2009 | Hronopoulos ............... 707/102 |
| 2010/0030859 A1 * | 2/2010 | Huang ........................... 709/206 |
| 2010/0083318 A1 * | 4/2010 | Weare et al. .................... 725/46 |
| 2010/0111372 A1 * | 5/2010 | Zheng et al. .................. 382/113 |
| 2010/0121850 A1 * | 5/2010 | Moitra et al. ................. 707/737 |
| 2010/0191663 A1 * | 7/2010 | Gross ............................. 705/341 |

* cited by examiner

*Primary Examiner* — Thanh-Ha Dang
(74) *Attorney, Agent, or Firm* — Patterson & Sheridan, LLP (57) ABSTRACT

A user data engine records profile data supplied by a user and usage data that is based on interactions between the user and a software application. A group data engine receives a set of user data comprising the profile data and the usage data for each user of a plurality of users. The group data engine determines a similarity value between each pair of users of the software application. The group data engine identifies groups of similar users based on the similarity values by executing one or more clustering algorithms. A user may then search for other users and groups of users of the software application and may then receive information from the users and/or groups of users that is related to use of the software application.

15 Claims, 7 Drawing Sheets

Build It
A forum for
Revit Professionals

Active Thread: Roof

--- chrisparrish
member since: 02.12.06
56% like you

Posted by: chrisparrish
Date: Dec/19/03 - 17:14 (GMT) Reply

I need to figure out how to change my roof from a hip roof to a gable roof. If anyone can help, I would appreciate it. Thanks.

---

Greg Cashen
member since: 03.11.04
28% like you

Reply From: Greg Cashen
Date: Dec/19/03 - 17:27 (GMT)

Select the roof and click the button that says "Edit Sketch" in the options bar above the editing window. On the hipped edges, there is an angle symbol. Select the edges you want to be gabled instead and uncheck the check box which says "Defines Slope" (again, in the options bar above the editing window). Click the button labeled "Finish Roof" in the Design Bar, Voila!

Greg

---

Bill Stephanson
member since: 03.11.04
72% like you

Reply From: Bill Stephanson
Date: Dec/19/03 - 18:13 (GMT)

Re: Roof
Select the roof a

FIG. 7

MANUAL AND AUTOMATIC TECHNIQUES FOR FINDING SIMILAR USERS

CROSS-REFERENCE TO RELATED APPLICATIONS

This application claims the priority benefit of Provisional U.S. Patent Application Ser. No. 61/118,153, filed Nov. 26, 2008, the subject matter of which is hereby incorporated by reference.

BACKGROUND OF THE INVENTION

1. Field of the Invention

The present invention generally relates to software usage and, more specifically, to manual and automatic techniques for finding similar users.

2. Description of the Related Art

A wide variety of software applications are currently available to users, including computer-aided design (CAD) applications, computer graphics applications, animation applications, word processing applications, and computer programming applications, among others. Many of these software applications are provided with a "help" database that provides a user with information related to the usage of the software application. For example, a help database associated with a CAD application may include a tutorial that teaches a user how to construct a simple geometrical shape.

A conventional help database allows a user to search for different help topics by inputting one or more keywords into a query window. Search software searches the help database based on the one or more keywords and returns a list of topics to the user. The user may then view articles associated with each returned topic. For example, the user of the CAD application may search for "shapes" and be provided with a list of topics that includes "drawing triangles," "drawing squares," and so forth. Some types of help databases may also automatically provide a user with a list of topics based on an action of the user. Each topic provided by the help database may be associated with an article related to a particular feature of the software application and may thus provide the user with information that enables the user to learn to use that feature of the software application. However, conventional help databases are typically limited in scope and content and may not include information helpful to the user. Additionally, conventional help databases may not always provide a user with relevant or useful information. For example, a conventional database may automatically provide a user with a particular set of help files every time the user performs a certain action. However, the user may perform the action while performing a variety of different tasks. The set of help files provided by the help database may thus be largely irrelevant and unhelpful to the user.

In other prior art approaches to providing help information to a user, the user may access an online forum related to usage of the software application in order to gain information that cannot be found in the help database. The online forum allows participants to communicate with one another by enabling different users of the software application to ask each other questions about the software application, exchange advice, or download data related to the software application, among other things.

A problem with online forums is that participants in the online forum may have vastly different levels of experience using the software application. Accordingly, the participants may not always be able to provide useful advice to other participants and may not be able to obtain the information that they are seeking via the online forum. In order to overcome these issues, an administrator of the online forum may organize the online forum into different groups based on skill level. A user may then join a group that includes others that have an equivalent skill level to the user. However, different users may judge their own skill levels differently, and so a user may join a group that is not appropriate for their skill level. For example, a "novice" user of the software application may overestimate their skill level and place themselves in the "expert" user group. The novice user would very likely fail to gather any useful information from the expert group and, additionally, may not be able to provide any of the "experts" in the expert group with any useful information or advice. Alternatively, a particular user may have expert level experience with a different aspect of the software application than other "expert" users in the same group as the user.

In addition, the online forum may be organized into groups of users with different areas of expertise. A user may then join a group that includes members with a particular area of expertise. However, different users with similar areas of expertise may use the software application differently. For example, a piping design expert may place themselves into a "CAD users" group that only includes professional architects.

As the foregoing illustrates, there is a need in the art for a more effective way to provide users of a software application with information related to usage of the software application.

SUMMARY OF THE INVENTION

Embodiments of the invention provide a computer-implemented method for generating one or more groups of similar users of a software application. The method includes generating a first set of usage data associated with a first user of the software application and generating a second set of usage data associated with a second user of the software application. The method further includes transmitting the first set of usage data and the second set of usage data to a server configured to generate a similarity value between the first user and the second user based on the first set of usage data and the second set of usage data and generating a similarity table that includes the similarity value and a plurality of additional similarity values generated between each user included in a set of users of the software application and each other user included in the set of users. The method further includes placing the first user and the second user together into a first group based executing one or more clustering algorithms that use the similarity table as an input and communicating to the first user that the first user and the second user are both in the first group.

Advantageously, embodiments of the invention provide a user of a software application the ability to quickly and easily identify users of the software application who can likely provide useful advice, resources, or instructions to the user.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
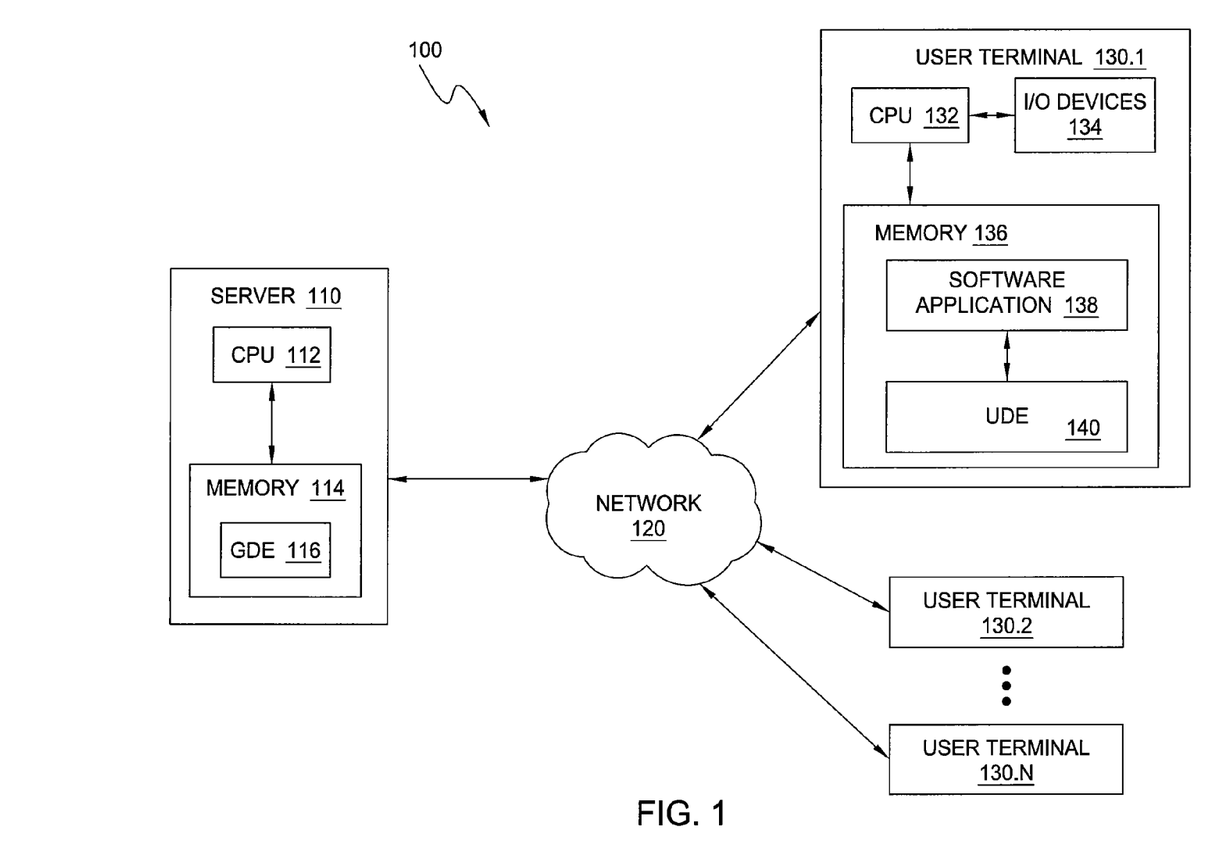
FIG. 1 is a conceptual diagram that illustrates a computer system configured to implement one or more aspects of the invention.

FIG. 1 is a conceptual diagram that illustrates a computing system 100 configured to implement one or more aspects of the invention. As shown, the computing system 100 includes a server 110, a network 120, and user terminals 130.1-130.N. The server 110 and the user terminals 130.1-130.N are computer systems that are each connected to the network 120 and may each transmit and receive data via the network 120. The network 120 may be any type of network including the world wide web, the Internet, a local area network (LAN), a wide area network (WAN), an intranet, a cellular network, or any other technically feasible type of network.

The server 110 may be, for example, a computer workstation or, alternatively, a distributed computer system comprising different processing clusters occupying different physical locations. As shown, the server 110 includes a central processing unit (CPU) 112 coupled to a memory 114. The CPU 112 may be, in some embodiments, implemented as a graphics processing unit (GPU), an application-specific integrated circuit (ASIC), a field programmable gate array (FPGA), or another type of processing unit.

The memory 114 includes a group data engine (GDE) 116 that is configured to receive data associated with users of the user terminals 130.1-130.N and process the received data to identify groups of similar users, as further described herein. The memory 114 may also store a driver (not shown) comprising program instructions that, when executed by the CPU 112, cause the CPU 112 to translate program instructions into different types of machine code. Additionally, the memory 114 stores data and executable instructions that may be transmitted to the user terminals 130.1-130.N via the network 120.

Each of the user terminals 130.1-130.N may be, for example, a laptop computer, a desktop computer, a cell phone, a personal desktop assistant (PDA), or another type of computer system. In one embodiment, each of the user terminals 130.1-130.N is substantially similar to each of the other user terminals 130.1-130.N. In another embodiment, one or more of the user terminals 130.1-130.N implements the functionality of the server 110.

As shown, the user terminal 130.1 includes a CPU 132 coupled to one or more input/output (I/O) devices 134 and to a memory 136. The CPU 132 is a processor configured to execute program instructions. The CPU 132 may be, in some embodiments, implemented as a graphics processing unit (GPU), an application-specific integrated circuit (ASIC), a field programmable gate array (FPGA), or another type of processing unit. The CPU 132 executes program instructions that may be stored in the memory 136 or stored in one or more of the I/O devices 134. The program instructions executed by the CPU 132 may also be received via the network 120 and stored in the memory 136 or in the I/O devices 134.

The I/O devices 134 allow the CPU 132 to receive and to transmit data and may include user input devices such as a keyboard, a keypad, or a mouse, storage devices and disk drives such as a tape drive, a floppy drive, a hard disk drive or a compact disk drive, and various display devices, such as a cathode-ray tube (CRT) monitor or a liquid-crystal display (LCD) monitor. The I/O devices 134 may also include other various other I/O devices.

The memory 136 may be a flash memory module, a hard disk drive, a read-only memory (ROM) unit, or another type of memory unit configured to store data. In one embodiment, the memory 136 stores a driver comprising program instructions that, when executed by the CPU 132, translates program instructions into different types of machine code. In another embodiment, the memory 136 may be accessed by the I/O devices 134. The memory 136 includes a software application 138 and a user data engine (UDE) 140

The software application 138 may be any technically feasible software application. The software application may be, for example, a computer-aided design (CAD) application, a computer graphics application, an animation application, a word processing application, or a computer programming application, among others. The software application 138 may receive input from the I/O devices 134 or transmit output to the I/O devices 134. Additionally, the software application 138 may access the network 120 in order to download data from or upload data to other computer systems via the network 120. For example, the software application 138 may access the server 110 and/or another user terminal via the network 120.

The UDE 140 is a software program comprising program instructions that, when executed by the CPU 132, records data associated with a user of the user terminal 130.1 and/or associated with the software application 138, as further described herein. The UDE 140 may also receive input from and/or transmit output to the I/O devices 134, the server 110 and/or the other user terminals. For example, the UDE 140 may access the server 110 and/or another user terminal via the network 120.

In one embodiment, the UDE 140 is configured to receive profile data associated with a user. The profile data may include, for example, the name, age, sex, occupation, company, office site, manager, title, floor group, experience with computers, experience with a particular software domain (e.g., architecture, animation, etc.), experience with the software application 138, experience with other software applications, city of residence, country of residence, primary spoken language, other spoken languages, commonly used tools associated with the software application 138, commonly used geometrical shapes associated with the software application 138, visual style used to render a 3D scene, textures implemented in a 3D scene, use of a certain file or collection of files, speed of operating the software application 138, time of day the software application 138 is launched, combination of applications used, commonly visited websites, domain of knowledge (e.g., character animator, rigging specialist, etc.), professional organization (e.g., Association for Computing Machinery (ACM), Institute of Electrical and Electronics Engineers (IEEE), etc.), emotional temperament, astrological sign, or version of the software application 138, among others.

In another embodiment, the UDE 140 is configured to monitor inputs to the software application 138. The inputs may include user commands issued by a user via I/O devices 134, such as keystrokes and keystroke combinations, selections of menu items or check boxes, selections of different tools (e.g., drawing tools in a CAD application), or activation of different features of the software application 138, among others. The inputs may also include data inputs into the software application 138 by the user, such as preferences or configuration information. The data inputs may further include files received by the software application 138 from the network 120 or from the I/O devices 134. The files may include software updates, plug-ins, help documentation, CAD drawings, computer graphics files, animations, text, or source code, among others. The inputs to the software application 138 may further include data transferred to the software application 138 from a different software application executing on the CPU 132.

In yet another embodiment, the UDE 140 is configured to monitor outputs from the software application 138. Outputs from the software application 138 may include files generated by the software application 138, such as CAD drawings, computer graphics files, animations, text, source code, error messages, installation logs, display data, audio data, emails, commands issued to the CPU 132, commands issued to other software programs executing on the CPU 132, data uploaded to the network 120, or data uploaded to I/O devices 134, among others.

The UDE 140 records some or all of the inputs to and outputs from the software application 138 and generates usage data associated with the user and/or associated with the software application 138. The usage data characterizes the usage of the software application 138 by the user based on one or more of the inputs to and/or the outputs from the software application 138.

In one embodiment, the usage data is represented as a command frequency table that records how often the user issues each of the different commands associated with the software application 138. The command frequency table may include an entry for each command input into the software application 138. In one embodiment, the entry for a particular command is updated each time the user enters that command. In alternative embodiments, the one or more entries in the command frequency table are updated periodically based on some time interval between updates. In some embodiments, the command frequency table also records other information associated with the command, such as the data being displayed when the command is entered, or the type of command that is entered. For example, the command frequency table may record each time a two-dimensional (2D) command is entered and, additionally, each time a three-dimensional (3D) command is entered. An example of a command frequency table is shown below in Table 1:

TABLE 1

| COMMAND | FREQUENCY |
| --- | --- |
| CTRL-X | 0.2 |
| ESC | 0.15 |
| CTRL-ALT-DLT | 0.15 |
| BACKSPACE | 0.5 |

As shown, Table 1 includes a first column labeled "Command" that stores different commands, such as CTRL-X or ESC. Each command in the first column may be issued to the software application 138. Table 1 also includes a second column labeled "Frequency" that includes an entry associated with a command included in the first column. Each entry in the second column represents the frequency with which the associated command is issued. Those skilled in the art will recognize that the commands listed in Table 1 represent exemplary commands that may be used to interact with the software application 138, and a wide range of different commands and the frequencies associated with those commands may be recorded in the command frequency table. In one embodiment, the frequency of commands may be represented as a percentage or as a fraction of the total number of commands entered by the user, as shown in Table 1. In alternative embodiments, the frequency of commands may be represented as a count of the number of times the command is issued by the user.

The UDE 140 generates a set of user data based on the usage data and the profile data associated with the user. The set of user data may be stored in the memory 136, output to the I/O devices 134, or transmitted to another computer system, such as the server 110 and/or another user terminal that is connected to the user terminal 130.1 via the network 120.

Each of the user terminals 130.1-130.N may be associated with a different user and may also store local copies of the software application 138 and the UDE 140. Each local copy of the UDE 140 generates a different set of user data associated with the user of that particular user terminal and with the local copy of the software application 138 executing on the particular user terminal. In one embodiment, each local copy of the UDE 140 is configured to transmit, via the network 120, the locally-generated set of user data to the GDE 116 included within the server 110.

The GDE 116 within the server 110 is configured to receive a set of user data from one or more of the user terminals 130.1-130.N and to compare each received set of user data to the other received sets of user data. Based on one or more comparisons performed by the GDE 116, the GDE 116 generates a similarity table that includes a similarity value for each comparison performed.

For example, the GDE 116 may receive a set of user data from each of the user terminal 130.1, the user terminal 130.2, and the user terminal 130.N. The GDE 116 may then compare the set of user data received from user terminal 130.1 with the set of user data received from the user terminal 130.N to generate a first similarity value. The GDE 116 may also compare the set of user data received from user terminal 130.2 with the set of user data received from the user terminal 130.N to generate a second similarity value. Finally, the GDE 116 may compare the set of user data received from user terminal 130.1 with the set of user received from the user terminal 130.2 to generate a third similarity value. The similarity values for each pair of user terminals occupy different locations in the similarity table.

In one embodiment, the similarity table includes a plurality of rows that each specifies a different one of the first, second, and third users based on the user terminal with which the user is associated. The similarity table also includes a plurality of columns that specifies a different one of the first, second, and third users. The point of intersection between a row-column pair indicates an entry in the similarity table that stores a similarity value representing the similarity between a user associated with the row in the row-column pair and a user associated with the column in the row-column pair. An example of a similarity table is shown below in Table 2:

TABLE 2

SIMILARITY TABLE

| USER TERMINALS | 130.1 | 130.2 | 130.N |
|---|---|---|---|
| 130.1 | — | 0.5 | 0.38 |
| 130.2 | 0.5 | — | 0.64 |
| 130.N | 0.38 | 0.64 | — |

In the example shown in Table 2, the user terminals 130.1, 130.2, and 130.N are listed in three different rows and three different columns. Continuing with the example outlined above, the first similarity value has a value equal to 0.38, the second similarity value has a value equal to 0.64, and the third similarity value has a value equal to 0.5. The similarity values stored in the similarity table represent the degree to which the commands issued by the users of the user terminals 130.1, 130.2, and 130.N are similar to one another. Those skilled in the art will recognize that a similarity table may be generated for any number of different users of the software application 138.

Once the GDE 116 generates the similarity table, the GDE 116 may then execute one or more clustering algorithms using the similarity table as input to generate group data. The group data identifies groups of similar users. For example, the k-means clustering algorithm performs the following five steps to generate k user groups based on similarity table, where k is an integer: 1) select a number of clusters, k; 2) randomly generate k random cluster centers; 3) assign each user to a nearest cluster center; 4) compute new cluster centers; 5) repeat steps 3-4 until a convergence criterion is met. Those skilled in the art will recognize that a plurality of clustering algorithms may be implemented to generate the group data based on the similarity table. The group data generated by the one or more clustering algorithms may be stored in the memory 114, distributed to the user terminals 130.1-130.N, or transmitted to another computer system via the network 120. In addition, the GDE 116 may display the group data on a screen associated with the server 110 or on one or more screens associated with the user terminals 130.1-130.N. In one embodiment, the GDE 116 executes the one or more clustering algorithms to generate a unique group for each user. The unique group associated with a particular user includes m other users most similar to the user out of the plurality of other users, where m is an integer.

Although embodiments of the invention are described above with reference to a particular GDE 116 executing on the server 110 that generates the similarity table and executes the one or more clustering algorithms to generate the group data, those skilled in the art will recognize that the different functionalities of the GDE 116 may also be executed in a distributed fashion by several different computer systems. In one such embodiment, the GDE 116 is distributed across one or more user terminals 130.1-130.N and is configured to generate the similarity table by generating a plurality of processing subtasks and distributing the plurality of processing subtasks to the user terminals 130.1-130.N to be executed in a distributed manner. Each of the user terminals 130.1-130.N performs a subset of the processing required to generate the similarity table and then uploads the result of the processing to a central location, such as the server 110 or to one of the user terminals 130.1-130.N, which combines the received results to generate the similarity table.

In another embodiment, the server 110 similarly executes the one or more clustering algorithms by generating another plurality of processing subtasks and distributing the another plurality of processing subtasks to the user terminals 130.1-130.N for distributed execution. Each of the user terminals 130.1-130.N performs a subset of the processing required to execute the processing subtasks associated with the one or more clustering algorithms and then uploads the result of the processing to a central location, such as the server 110 or to one of the user terminals, which combines the received results to generate the group data.

In addition to the functionality described above, the GDE 116 may also be configured to update pre-existing group data when an additional set of user data becomes available. For example, group data may have been previously generated for a plurality of users of the software application 138. When an additional set of user data is generated for an additional user, the additional set of user data may be transmitted to the GDE 116 and then used to update a pre-existing similarity table associated with the pre-existing group data. The one or more clustering algorithms may be executed to generate updated group data, and the updated group data may then be transmitted to each of the user terminals 130.1-130.N. Additionally, updating the pre-existing group data may be implemented using one or more of the distributed processing techniques described above.

The GDE 116 may be further configured to allow users that belong to the same group (i.e., members of the group) to communicate with one another via a communication platform. The communication platform includes, for example, a message board, a chat room, a forum, or a database, among others. The communication platform allows members of each group to post questions, converse with one another via text (i.e., online chatting), provide advice, exchange files, download or upload data and/or executable code related to the software application 138, and receive information related to different members of each group, such as profile information, among others. The communication platform may also indicate to the user a similarity value between the user and the other users in the group. The communication platform may be generated locally on each user terminal 130.1-130.N or, alternatively, the communication platform may be generated by the server 110 and accessed by users of the user terminals 130.1-130.N via the network 120.

As described above, one embodiment provides a technique whereby users are automatically placed into one or more groups based on a set of user data associated with the user. In alternative embodiments, the GDE 116 allows the user to manually join, as a "guest" member, a group with which the user was not automatically identified. The guest member may interact with the communication platform to access information associated with the group in a limited way, and may download data and/or executable code associated with the software application 138 via the communication platform. However, the guest member is not identified with the group as a member and, in some examples, may not post questions, communicate with other group members (e.g., non-guest members), upload data, or provide advice.

The guest member is prevented from fully participating in the group since the guest member may not necessarily be able to provide useful or relevant information to the members of the group. This situation may occur, for example, when the guest member is a novice user of the software application 138 and the members of the group are expert users of the software application 138. Providing the guest member with limited access to the members of the group ensures that the members of the group only interact with other similar users, as initially identified by the one or more clustering algorithms, and do not expend excess time interacting with users that use the software application 138 differently. In one embodiment, a member of the group may recommend to the other members of the group that a guest member should be given full membership status, despite the guest member not having been initially identified with the group. The guest member may then be allowed to join the group as a full member. In one embodiment, the members of a group may not allow guest members to join the group, making the group "private."

In one embodiment, the GDE 116 generates group characteristic data associated with each group. The group characteristic data is representative of the group as a whole and is based on the different sets of user data associated with each member of the group. The characteristic set of user data may, for example, be generated by averaging the command frequency table for each user in the group to generate an average command frequency table. In one embodiment, when a user joins a group as a guest member, as described above, the set of user data associated with the guest member does not contribute to the group characteristic data associated with the group. In this fashion, the characteristics group data associated with the group accurately represents the members of the group initially identified by the one or more clustering algorithms, and is not skewed or altered by any users that join the group as guest members.

Figure 5:
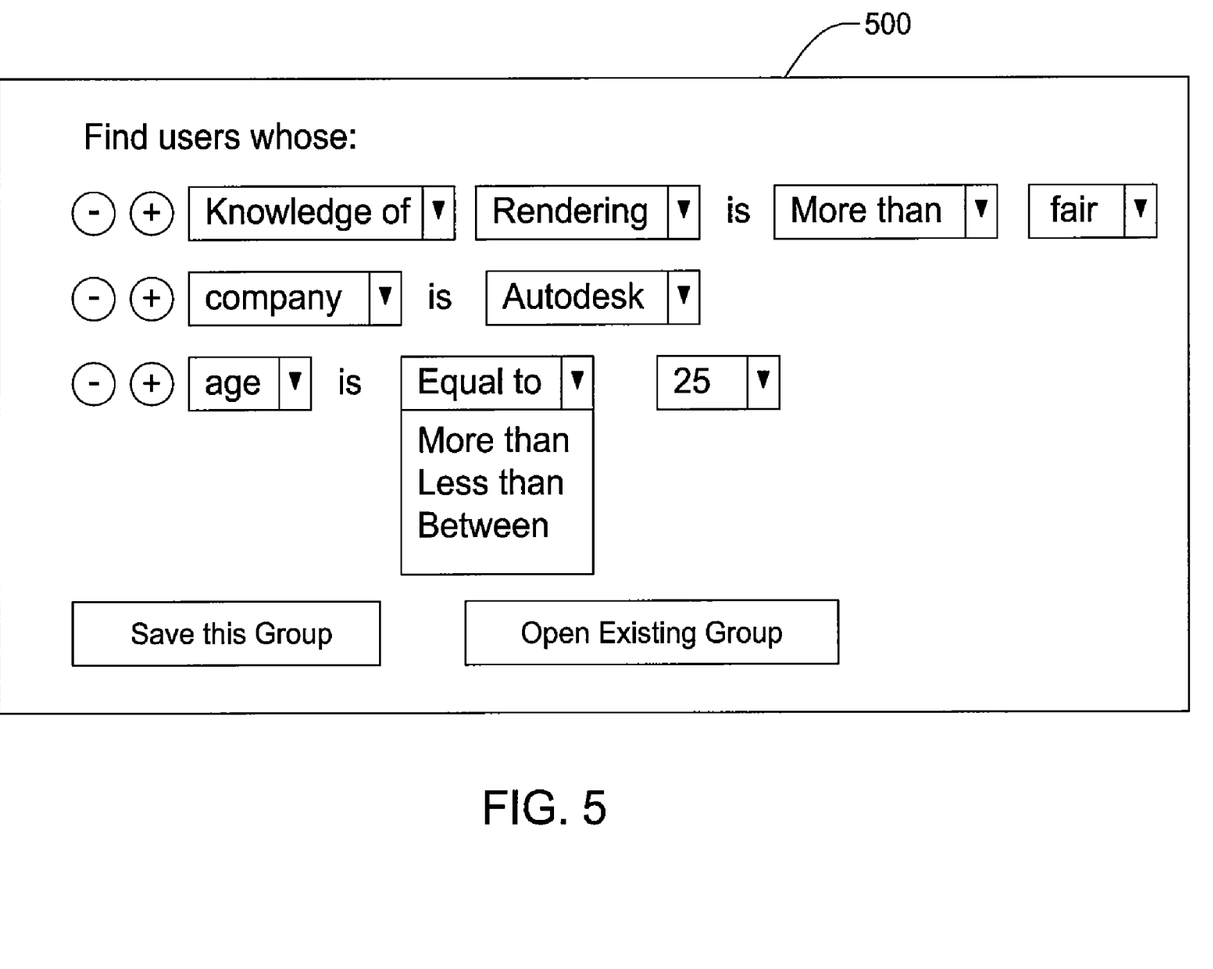
FIG. 5 is a screenshot of a search interface, according to one embodiment of the invention.

The GDE 116 may also be configured to allow a user to search for other users of the software application 138 that have one or more attributes. The one or more attributes may, for example, be age, sex, occupation, company, office site, manager, title, floor group, experience with computers, experience with a particular software domain (e.g., architecture, animation, etc.), or experience with the software application 138, among other things. Attributes associated with each user may be included in the one or more sets of user data received by the GDE 116. The GDE 116 receives search criteria from the user that specifies the one or more attributes. The GDE 116 filters the one or more sets of user data and identifies users with the specified attributes. The search results may then be provided to the user. This type of search technique is referred to herein as "rule-based" searching. As described in greater detail below, FIG. 5 is an example of a screenshot of an interface that allows users to search for other users.

In one embodiment, each time a user performs a rule-based search, the results of the rule-based search identify "group" of users that satisfy the search criteria. For example, a user may search for users that are of a particular age and that have a particular number of years of experience with the software application 138. The results of this search identify the users that meet the specified criteria, and those users constitute an additional group of users. The additional group of users may not have been initially identified by the one or more clustering algorithms implemented by the GDE 116. In one embodiment, the group data may be updated to reflect the additional group identified by the rule-based search. In alternative embodiments, the additional group remains a private group that can only be accessed by the user that performed the rule-based search. Additionally, the GDE 116 may generate a characteristic set of user data for the additional group.

Figure 7:
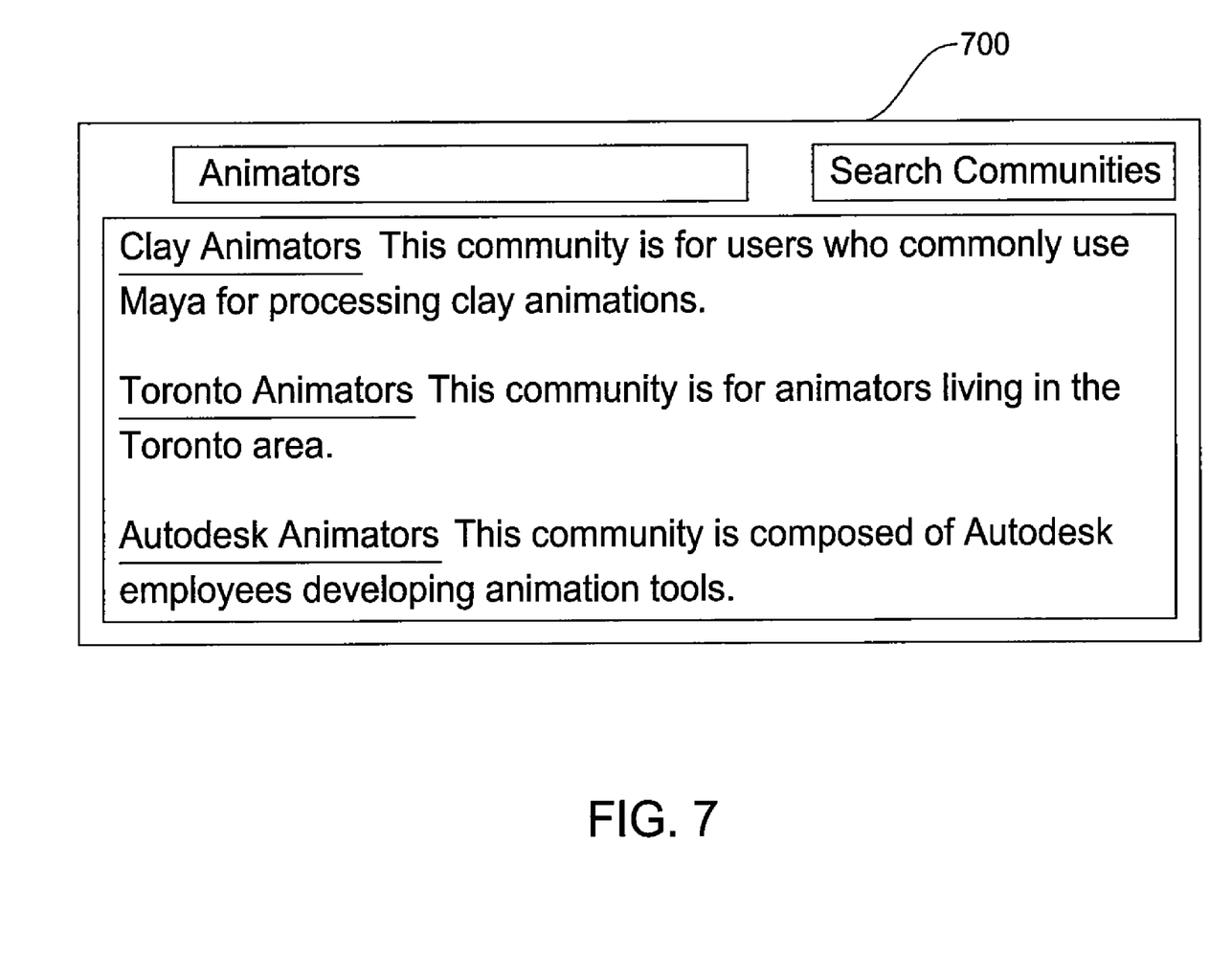
FIG. 7 is a screenshot of a search interface 700, according to one embodiment of the invention.

The GDE 116 may be further configured to allow a user to search for groups of users that satisfy the search criteria. The GDE 116 receives the search criteria from the user that specifies one or more attributes and then filters the group data to identify groups that meet the search criteria. The search criteria may include, for example, animators, animators living in a particular area, architects, amateur CAD users, CAD professionals, or engineers, among others. In one embodiment, the GDE 116 implements a rule-based search, similar to the rule-based search described above, in order to identify groups that meet the search criteria. For example, the GDE 116 may filter the groups based on a comparison of the search criteria and the group characteristic data associated with each group. In some embodiments, the GDE 116 does not include private groups in the search results. FIG. 7, described in greater detail below, is an example of a search screen that allows a user to search for groups of users.

Embodiments of the invention thus provide various techniques related to automatic and manual generation of groups of similar users of a software application. The groups of similar users are automatically generated based on a set of user data that includes profile data and/or usage data. The profile data is received from the user, while the usage data is generated based on interactions between the user and the software application. The groups of similar users are manually generated when the user searches for other users that meet specific criteria. The manually-generated groups of users are generated based on the search results. Members of each group may communicate with one another and exchange information related to the software application via a communication platform such as, for example, an online message board. Since the members of each group have sets of user data that are similar to the sets of user data associated with other members of the group, the user is more likely to receive helpful information related to use of the software application 138.

Figure 2:
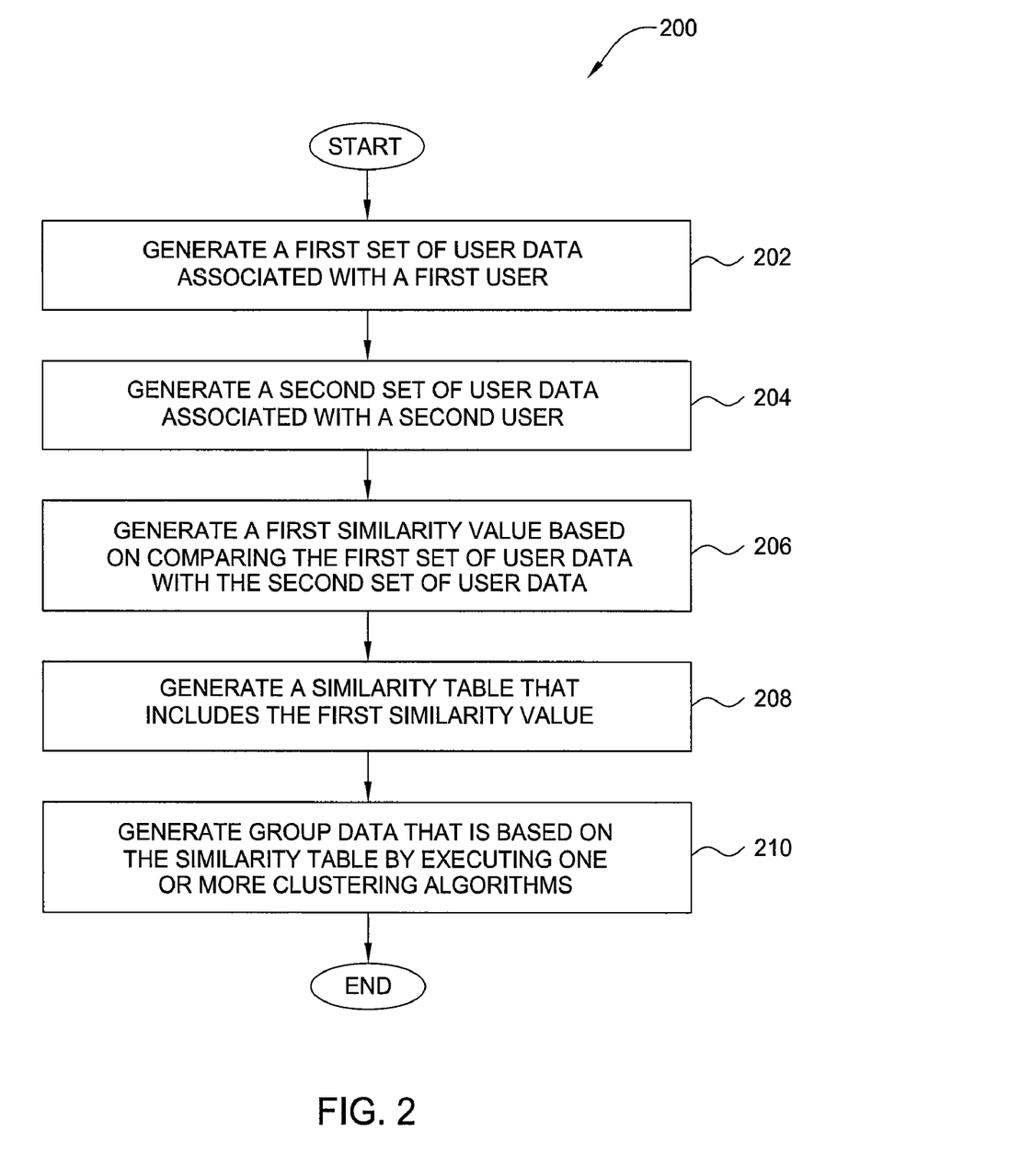
FIG. 2 is flowchart of method steps for automatically generating groups of similar users of a software application, according to one embodiment of the invention.

FIG. 2 is flowchart of method steps for automatically generating groups of similar users of a software application, according to one embodiment of the invention. Persons skilled in the art will understand that, even though the method 200 is described in conjunction with the systems of FIG. 1, any system configured to perform the method steps, in any order, is within the scope of the present invention.

As shown, the method 200 begins at step 202, where the UDE 140 generates a first set of user data associated with a first user of the software application 138. The first user may be associated with a user terminal, such as user terminal 130.1, and may interact with the software application 138 via the user terminal 130.1. Those skilled in the art will recognize that different copies of the software application 138 and the UDE 140 may execute on several different computer systems, including the user terminals 130.1-130.N. Those skilled in the art will further recognize that the software application 138 with which the first user interacts, as well as the UDE 140 that generates the first set of user data, are both executed on the user terminal with which the first user is associated.

The UDE 140 generates the first set of user data based on profile data and usage data. The profile data is received from the user and may include, for example, the name, age, sex, occupation, employer, manager, title, group or computer experience of the user, as well as the experience of the user with the software application 138, among other things. The usage data is based on the inputs to and outputs from the software application 138 when the user interacts with the software application 138.

In one embodiment, the usage data generated for the user is a command frequency table that includes an entry for each command issued by the user to the software application 138. The command frequency table may further include a value associated with each command that represents how frequently that command is issued. For example, the value may be an integer that represents the number of times the command was issued or, alternatively, a fraction of the total number of commands.

At step 204, the UDE 140 generates a second set of user data associated with a second user. In one embodiment, the second user is associated with a user terminal, such as user terminal 130.1, and may interact with the software application 138 via the user terminal 130.1. Those skilled in the art will recognize that the second user may be associated with the same user terminal with which the first user is associated. In this situation, the second user interacts with the same copy of the software application 138 as the first user. Additionally, the first set of user data and the second set of user data are generated by the same copy or a different copy of the UDE 140.

In alternative embodiments, the second user may be associated with a different user terminal than the user terminal 130.1 with which the first user is associated. In this situation, the second user interacts with a copy of the software application 138 local to the user terminal with which the second user is associated. Additionally, the second set of user data is generated by a copy of the UDE 140 that is local to the user terminal with which the second user is associated. The second set of user data may be based on profile data and/or usage data, as described above, that is associated with the second user.

At step 206, the GDE 116 generates a first similarity value based on comparing the first set of user data with the second set of user data. The first similarity value represents the degree to which the first user is similar to the second user. In some embodiments, the first similarity value is a decimal value. In embodiments where the each set of user data includes a command frequency table, as described above, the similarity value represents the degree to which the commands issued by the first user are similar to the commands issued by the second user.

At step 208, the GDE 116 generates a similarity table that includes the first similarity value. In one embodiment, the first similarity value is stored within a row associated with the first user and within a column associated with the second user. The first similarity value is stored at a location in the similarity table corresponding to the point of intersection between the row associated with the first user and the column associated with the second user.

Those skilled in the art will understand that a set of user data may be generated for each user of a plurality of different users, other than the first and second users, of the software application 138 and, further, that a similarity value may be generated based on comparing any two users of the plurality of different users. Accordingly, the similarity table may be populated with similarity values generated based on comparing each user to each other user of the software application 138.

At step 210, the GDE 116 generates group data that is based on the similarity table by executing one or more clustering algorithms. In one embodiment, the one or more clustering algorithms include k-means clustering, quality threshold clustering, or spectral clustering. The group data specifies groups of similar users of the software application 138. In embodiments where each set of user data includes a command frequency table, the groups of similar users each include users that issue similar commands to the software application 138.

In addition to generating group data based on a set of user data associated with each user of the plurality of users, the GDE 116 is also configured to provide updated group data based on a set of user data associated with an additional user, thus identifying the additional user with one or existing groups of users.

Figure 3:
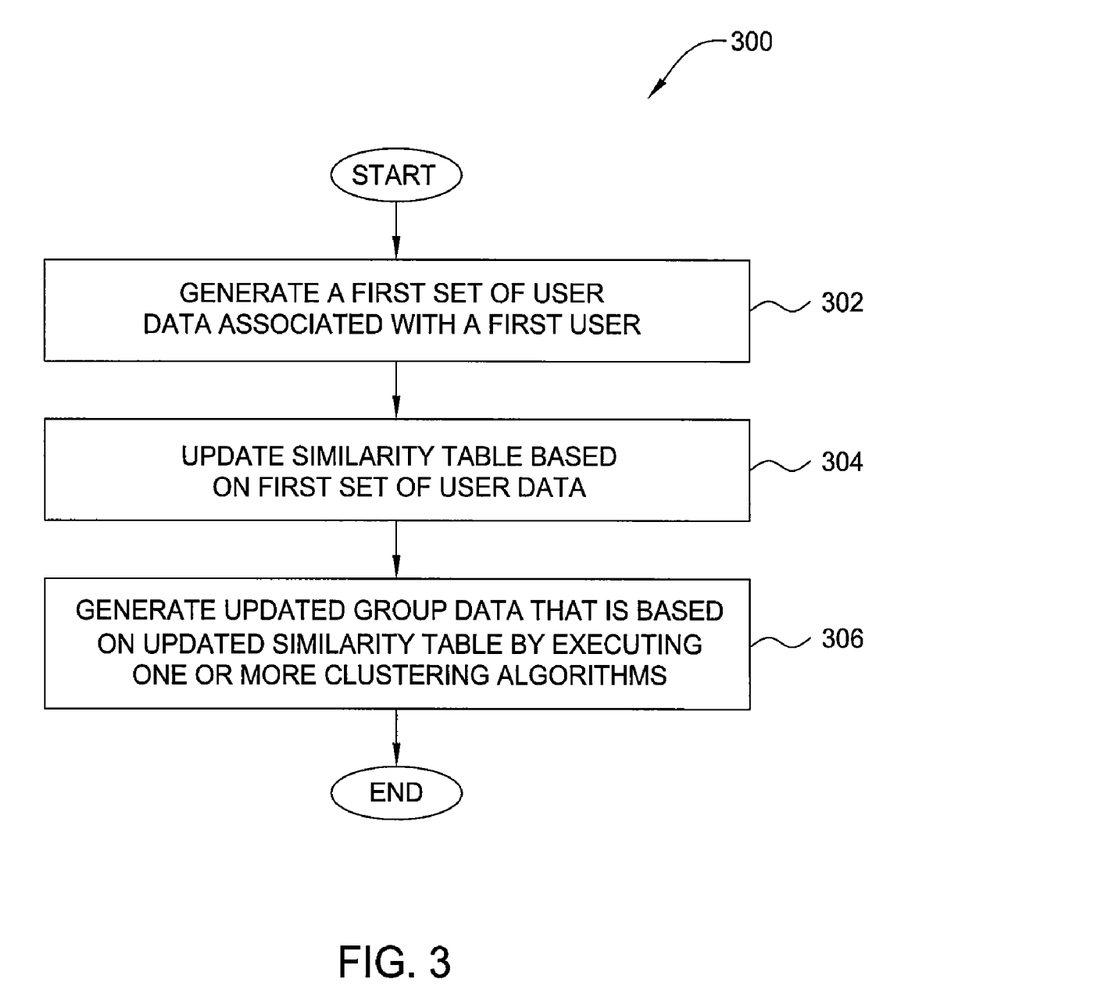
FIG. 3 is a flowchart of method steps for identifying a user with one or more groups of similar users of the software application, according to one embodiment of the invention.

FIG. 3 is a flowchart of method steps for identifying a user with one or more groups of similar users of the software application, according to one embodiment of the invention. Persons skilled in the art will understand that, even though the method 300 is described in conjunction with the systems of FIG. 1, any system configured to perform the method steps, in any order, is within the scope of the present invention.

As shown, the method 300 begins at step 302, where the UDE 140 generates a first set of user data for a first user. As described in FIGS. 1-2, the UDE 140 generates the first set of user data based on profile data and/or usage data. The profile data is received from the first user, while the usage data is generated based on the interactions between the first user and the software application 138. The software application 138 is stored on a computer system, such as the user terminal 130.1, with which the first user interacts.

At step 304, the GDE 116 updates a pre-existing similarity table to reflect the first set of user data. The pre-existing similarity table includes an entry for each pair of users of the plurality of users of the software application 138. In embodiments where the similarity table is implemented with a plurality of rows that each specify a different user and a plurality of columns that each specify a different user, updating the pre-exiting similarity table comprises adding a row to the similarity table for the additional user and adding a column to the similarity table for the additional user. Those skilled in the art will recognize that, although the step of updating the pre-existing similarity table is described herein with respect to a first user, the pre-existing similarity table may be updated with any number of additional users of the software application 138.

At step 306, the GDE 116 generates group data based on the similarity table by executing one or more clustering algorithms. As previously described, the group data identifies groups of similar users based on a set of user data associated with each user. In one embodiment, step 306 is substantially similar to step 210, described in FIG. 2.

Figure 4:
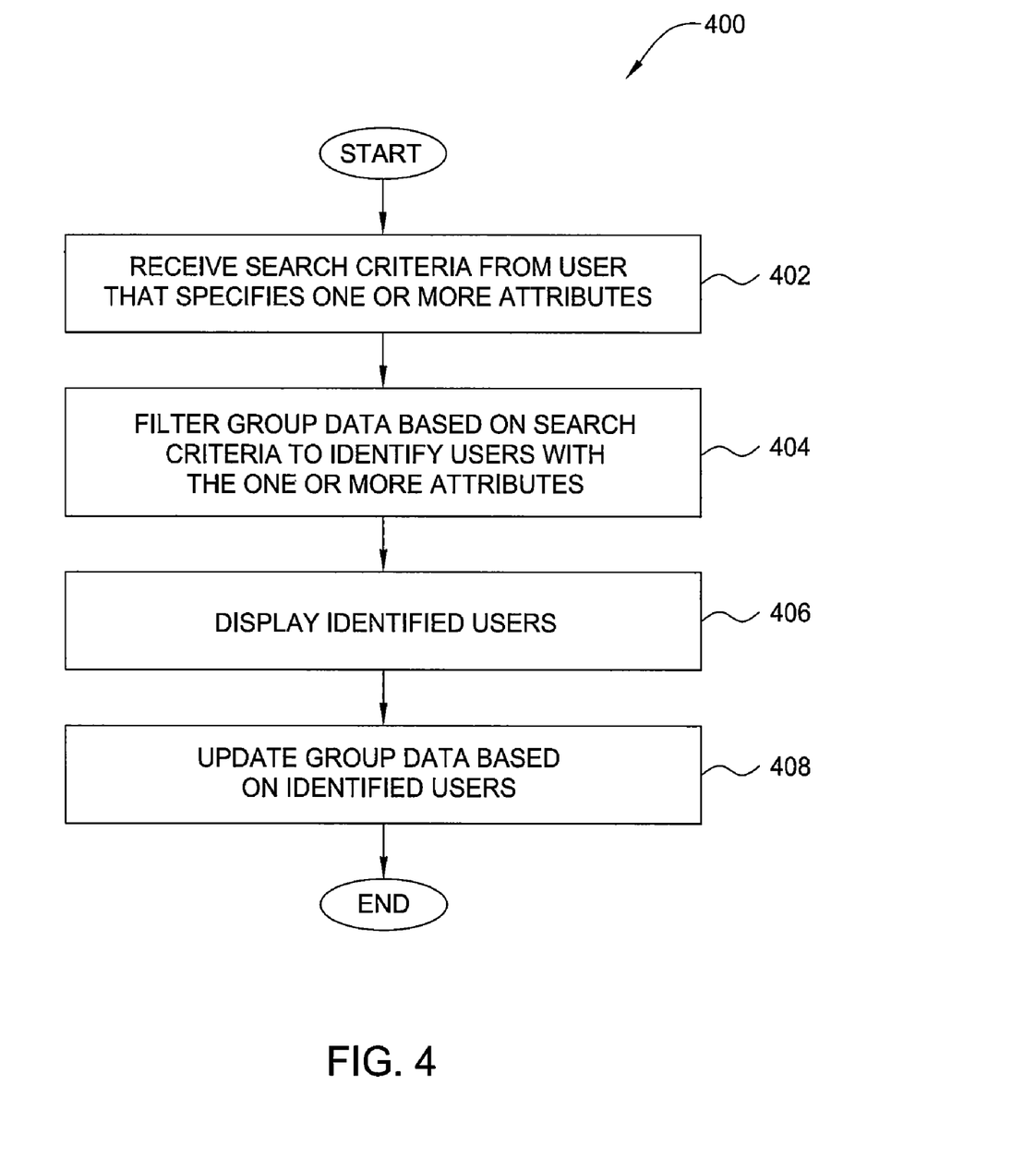
FIG. 4 is a flowchart of method steps for filtering a plurality of groups of users of the software application, according to one embodiment of the invention.

FIG. 4 is a flowchart of method steps for filtering a plurality of groups of users of the software application, according to one embodiment of the invention. Persons skilled in the art will understand that, even though the method 400 is described in conjunction with the system of FIG. 1, any system configured to perform the method steps, in any order, is within the scope of the present invention.

As shown, the method 400 begins at step 402, where the GDE 116 receives search criteria from the user that specifies one or more attributes of interest to the user. As previously described, the one or more attributes may include, for example, age, occupation, employer, amount of time using the software application 138, group memberships, or similarity value relative to the user. In one embodiment, the GDE 116 generates a search interface and displays the query box to the user. The user may then enter the search criteria into the query box. FIG. 5 is a screenshot of a search interface 600, according to one embodiment of the invention. As shown in FIG. 5, the search interface 500 includes a plurality of fields that may be manipulated by the user to specify the search criteria.

Referring again to FIG. 4, at step 404, the GDE 116 filters the group data to identify users with the specified attributes according to the search criteria. This search technique is referred to herein as "rule-based" searching. At step 406, search results are provided to the user. The search results include a list of users that satisfy the search criteria. In one embodiment, the list of users is ranked according to the similarity values between the identified users and the user that provided the search criteria.

At step 408, the GDE 116 updates the group data based on the results of the rule-based search. As described, the results of the rule-based search identify users that meet the search criteria. Those users may comprise an additional "group" of users. The additional group of users may not have been initially identified by the one or more clustering algorithms implemented by the GDE 116, as described in FIGS. 2 and 3. In this fashion, a user may manually generate a group by providing the GDE 116 with search criteria. The GDE 116 may also then generate a characteristic set of user data for the additional group.

Once the GDE 116 identifies one or more user groups based on the received search criteria, the user may access the communication platform and join one or more of the identified groups as a guest member. The guest member may receive information associated with the group via the communication platform, but may be restricted from other actions, such as uploading data.

Figure 6:
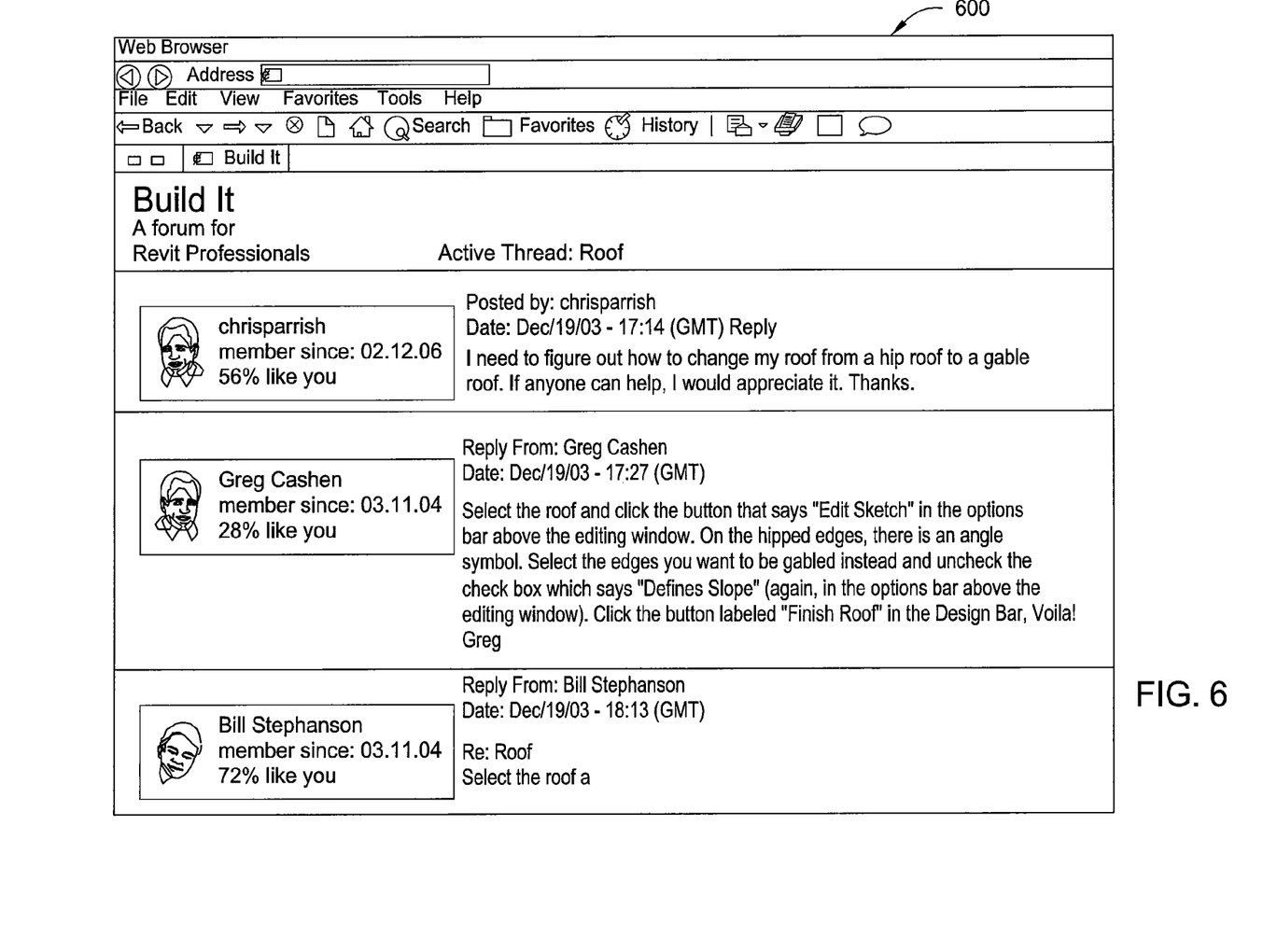
FIG. 6 is a screenshot of a forum related to usage of the software application, according to one embodiment of the invention.

In one embodiment, the communication platform is a forum. FIG. 6 is a screenshot 600 of a forum related to usage of the software application, according to one embodiment of the invention. The forum may be accessible to members of a particular "group," as described herein. In one embodiment, the user is not a member of the group, although the user may join the forum as a guest member. The user may then download information associated with the forum but may not be permitted to upload information to the forum. Also, the set of user data associated with the user may not contribute to the group characteristics data associated with the group.

FIG. 7 is a screenshot of a search interface 700, according to one embodiment of the invention. As previously described herein, the GDE 116 generates the search interface and allows a user to search for groups based on one or more attributes via the search interface 700. The search interface 700 receives search criteria from the user that specifies the one or more attributes, and the GDE 116 then filters the group data to identify a set of groups that meet the search criteria. The search criteria may include, for example, animators, animators living in a particular area, architects, amateur CAD users, CAD professionals, or engineers, among others. In one embodiment, the GDE 116 implements a rule-based search to identify groups that satisfy the search criteria by comparing the one or more attributes of the group characteristic data of the various groups. In another embodiment, the GDE 116 does not include private groups in the search results.

In sum, a user data engine (UDE) generates a set of user data associated with a user of a software application based on profile data and usage data. The profile data may be based on information received directly from a user, while the usage data may be based on interactions between the user and a software application. A different UDE may be implemented to generate different sets of user data associated with a plurality of different users. A group data engine (GDE) receives the set of user data from the user and compares the set of user data to other sets of user data to generate a similarity value for each pair of users. The similarity value between two users represents the degree to which the sets of user data associated with those two users are alike. The GDE populates a similarity table with similarity values generated for each pair of users. The GDE executes one or more clustering algorithms based on the similarity table to generate group data that identifies one or more clusters of similar users, or "groups." The GDE may also identify a unique group associated with each unique user.

An additional user may become associated with one or more existing groups after using the software application and after the GDE has received a set of user data associated with the additional user. The GDE generates a similarity value between the additional user and each existing user of the software application and updates the similarity table with the additional similarity values. The GDE then executes the one or more clustering algorithms with the updated similarity table to generate updated group data that identifies one or more groups to which the user belongs.

The user may also search the different groups generated by the GDE by inputting search criteria through a search interface provided by the GDE. The user may enter search criteria related to group characteristic data or attributes of individual users of the software application. The search criteria may include, for example, age, location, time spent using the software application, or profession, among others. The GDE filters the group data and/or the sets of user data based on the search criteria and provides the user with search results that indicate groups and/or other users that satisfy the search criteria.

Advantageously, embodiments of the invention provide a user of a software application the ability to quickly and easily identify users of the software application who can likely provide useful advice, resources, or instructions to the user. Thus, based on the techniques disclosed herein, the user is able to more efficiently obtain relevant help information related to the software application.

While the forgoing is directed to embodiments of the invention, other and further embodiments of the invention may be devised without departing from the basic scope thereof. For example, aspects of the invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for generating one or more groups of similar users of a software application, the method comprising:

generating a first set of usage data associated with a first user of the software application;

generating a second set of usage data associated with a second user of the software application;

transmitting the first set of usage data and the second set of usage data to a server configured to generate a similarity value between the first user and the second user based on the first set of usage data and the second set of usage data;

generating a similarity table that includes the similarity value and a plurality of additional similarity values generated between each user included in a set of users of the software application and each other user included in the set of users, wherein each user included in the set of users is associated with a different set of usage data that comprises a command frequency table of one or more commands issued by the user to the software application and, for each of the one or more commands, an indication of a frequency with which the command is issued by the user;

placing the first user and the second user together into a first group based executing one or more clustering algorithms that use the similarity table as an input; and communicating to the first user that the first user and the second user are both in the first group.

2. The method of claim 1, wherein the indication of the frequency comprises a percentage of a total number of commands issued by the first user.

3. The method of claim 1, wherein the indication of the frequency comprises a count of a number of times the command is issued by the first user.

4. The method of claim 1, further comprising the steps of:

generating group data that specifies a plurality of groups of users by executing the one or more clustering algorithms, wherein each group of users is associated with different group characteristic data;

transmitting the group data to a computing device used by the first user;

receiving an input from the first user specifying a first group of which the first user is not a member;

associating the first user with the first group as a guest member, wherein the first set of usage data does not contribute to the group characteristic data associated with the first group; and allowing the first user to communicate in a limited manner with at least one other member in the first group via a communication platform.

5. The method of claim 4, wherein the communication platform comprises a message board, a chat room, a forum, or a database.

6. The method of claim 4, further comprising the steps of:

receiving search criteria from the first user that includes at least one search criterion that is related to usage of the software application;

filtering the first, second, and different sets of usage data to determine that a subset of users in the set of users satisfies the search criteria;

displaying on a display device an indication of the subset of users; and allowing the first user to communicate in a limited manner with at least one user included in the subset of users.

7. The method of claim 4, wherein the search criteria includes at least one of an amount of time a user has been using the software application, a similarity value between the first user and another user, command usage, or files generated using the software application.

8. A non transitory computer-readable storage medium storing instructions that, when executed by a processor, cause a computing system to generate one or more groups of similar users of a software application, by performing the steps of:

generating a first set of usage data associated with a first user of the software application;

generating a second set of usage data associated with a second user of the software application;

transmitting the first set of usage data and the second set of usage data to a server configured to generate a similarity value between the first user and the second user based on the first set of usage data and the second set of usage data;

generating a similarity table that includes the similarity value and a plurality of additional similarity values generated between each user included in a set of users of the software application and each other user included in the set of users, wherein each user included in the set of users is associated with a different set of usage data that comprises a command frequency table of one or more commands issued by the user to the software application and, for each of the one or more commands, an indication of a frequency with which the command is issued by the user;

placing the first user and the second user together into a first group based executing one or more clustering algorithms that use the similarity table as an input; and communicating to the first user that the first user and the second user are both in the first group.

9. The non transitory computer-readable storage medium of claim 8, wherein the indication of the frequency comprises a percentage of a total number of commands issued by the first user.

10. The non transitory computer-readable storage medium of claim 8, wherein the indication of the frequency comprises a count of a number of times the command is issued by the first user.

11. The non transitory computer-readable storage medium of claim 8, further comprising the steps of:

generating group data that specifies a plurality of groups of users by executing the one or more clustering algorithms, wherein each group of users is associated with different group characteristic data;

transmitting the group data to a computing device used by the first user;

receiving an input from the first user specifying a first group of which the first user is not a member;

associating the first user with the first group as a guest member, wherein the first set of usage data does not contribute to the group characteristic data associated with the first group; and allowing the first user to communicate in a limited manner with at least one other member in the first group via a communication platform.

12. The non transitory computer-readable storage medium of claim 11, wherein the communication platform comprises a message board, a chat room, a forum, or a database.

13. The non transitory computer-readable storage medium of claim 11, further comprising the steps of:

receiving search criteria from the first user that includes at least one search criterion that is related to usage of the software application;

filtering the first, second, and different sets of usage data to determine that a subset of users in the set of users satisfies the search criteria;

displaying on a display device an indication of the subset of users; and allowing the first user to communicate in a limited manner with at least one user included in the subset of users.

14. The non transitory computer-readable storage medium of claim 11, wherein the search criteria includes at least one of an amount of time a user has been using the software application, a similarity value between the first user and another user, command usage, or files generated using the software application.

15. A computer system for generating one or more groups of similar users of a software application, the computer system comprising:

a processor; and a memory storing instructions that, when executed by the processor, are configured to:

generate a first set of usage data associated with a first user of the software application, generate a second set of usage data associated with a second user of the software application, transmit the first set of usage data and the second set of usage data to a server configured to generate a similarity value between the first user and the second user based on the first set of usage data and the second set of usage data, generate a similarity table that includes the similarity value and a plurality of additional similarity values generated between each user included in a set of users of the software application and each other user included in the set of users, wherein each user included in the set of users is associated with a different set of usage data that comprises a command frequency table of one or more commands issued by the user to the software application and, for each of the one or more commands, an indication of a frequency with which the command is issued by the user, place the first user and the second user together into a first group based executing one or more clustering algorithms that use the similarity table as an input, and communicate to the first user that the first user and the second user are both in the first group.

* * * * *